(12) United States Patent
Guyon

(10) Patent No.: US 11,364,791 B2
(45) Date of Patent: Jun. 21, 2022

(54) VENTILATION DEVICE FOR A VEHICLE, ASSOCIATED VEHICLE

(71) Applicant: Flex-N-Gate France, Audincourt (FR)

(72) Inventor: Cyrille Guyon, Nommay (FR)

(73) Assignee: Flex-N-Gate France, Audincourt (FR)

( * ) Notice: Subject to any disclaimer, the term of this patent is extended or adjusted under 35 U.S.C. 154(b) by 86 days.

(21) Appl. No.: 16/850,883

(22) Filed: Apr. 16, 2020

(65) Prior Publication Data

US 2020/0331340 A1 Oct. 22, 2020

(30) Foreign Application Priority Data

Apr. 16, 2019 (FR) ...................... 19 04039

(51) Int. Cl.
*B60K 11/00* (2006.01)
*B60K 11/08* (2006.01)
*B60K 11/04* (2006.01)

(52) U.S. Cl.
CPC ............. *B60K 11/085* (2013.01); *B60K 11/04* (2013.01)

(58) Field of Classification Search
CPC ........ B60K 11/085; B60K 11/08; B60K 11/04
USPC ....................................... 180/68.1
See application file for complete search history.

(56) References Cited

U.S. PATENT DOCUMENTS

| | | | | |
|---|---|---|---|---|
| 8,807,166 | B2* | 8/2014 | Charnesky | B60K 11/085 137/601.08 |
| 9,828,036 | B2* | 11/2017 | Frayer | G01S 13/931 |
| 9,840,144 | B2* | 12/2017 | Aizawa | B60K 11/08 |
| 10,024,560 | B2* | 7/2018 | Schneider | B60K 11/085 |
| 10,071,625 | B1* | 9/2018 | Stoddard | B60K 11/085 |
| 10,160,309 | B2* | 12/2018 | Schwarz | B60K 11/085 |
| 10,166,858 | B2* | 1/2019 | Ibanez | B60K 11/085 |
| 10,175,669 | B2* | 1/2019 | Karamanos | G05B 19/042 |
| 10,272,768 | B2* | 4/2019 | Huijzers | B60K 11/085 |
| 2012/0305818 | A1* | 12/2012 | Charnesky | B60K 11/085 251/212 |

(Continued)

FOREIGN PATENT DOCUMENTS

| | | |
|---|---|---|
| DE | 3905717 A1 | 8/1990 |
| DE | 10002023 A1 | 8/2001 |

(Continued)

OTHER PUBLICATIONS

French Search Report corresponding to French Application No. FR 1904039, dated Jan. 30, 2020, 2 pages.

*Primary Examiner* — Hau V Phan
(74) *Attorney, Agent, or Firm* — Reising Ethington P.C.

(57) ABSTRACT

A ventilation device for a vehicle includes a frame defining an opening and a closing device having at least one closing flap extending in a general direction in the opening. The closing device is movable between an open position and a closing position, the flap being movable between an open position and a closing position. The closing device includes a first actuator configured to move the closing flap between its open and closed positions by a first actuating point. The ventilation device includes a second actuator configured to move the closing flap between its open and closed positions by a second actuating point, the second actuating point being separate from the first actuating point, the first and second actuators being configured to move the closing flap jointly.

11 Claims, 2 Drawing Sheets

(56) References Cited

U.S. PATENT DOCUMENTS

| | | | | |
|---|---|---|---|---|
| 2013/0252531 A1* | 9/2013 | Asano | ............... | B60K 11/085 |
| | | | | 454/155 |
| 2015/0217633 A1 | 8/2015 | Huijzers et al. | | |
| 2016/0236563 A1* | 8/2016 | Ruppert | ............... | B60R 19/52 |
| 2018/0134146 A1* | 5/2018 | Vacca | ............... | B60R 19/52 |

FOREIGN PATENT DOCUMENTS

| | | |
|---|---|---|
| DE | 202013002675 U1 | 4/2013 |
| EP | 3109084 A1 | 12/2016 |
| WO | 2018198664 A1 | 11/2018 |

* cited by examiner

VENTILATION DEVICE FOR A VEHICLE, ASSOCIATED VEHICLE

CROSS-REFERENCE TO RELATED APPLICATIONS

This application is a U.S. non-provisional application claiming the benefit of French Application No. 19 04039, filed on Apr. 16, 2019, which is incorporated herein by reference in its entirety.

TECHNICAL FIELD

The present invention relates to a ventilation device for a vehicle comprising a frame defining an opening and a closing device comprising at least one closing flap extending in a general direction in the opening, the closing device being movable between an open position and a closing position, in which a passage surface for the air through the ventilating device is smaller than the passage surface for the air in the open position, the flap being movable between an open position when the closing device is in the open position and a closing position when the closing device is in the closing position, the closing device comprising a first actuator configured to move the closing flap between its open and closed positions by a first actuating point.

The invention more specifically relates to a ventilating device configured to manage air flows of a motor vehicle. This system can advantageously be used to manage the temperature of the engine of the vehicle, but it can also be used to manage the aerodynamics of the vehicle.

BACKGROUND

Such a ventilation device is for example arranged at the front of the vehicle and is part of the grille of the vehicle. The ventilation device makes it possible to manage an incoming air flow configured to be in contact with the radiator cooling system of the engine and making it possible to keep the engine at the optimal operating temperature. This known device advantageously makes it possible to combine a high-performing aerodynamic shape of the vehicle and an optimal operating temperature of the engine.

These ventilation devices are most often hidden behind grates or grilles.

The closing devices of these ventilation devices raise problems of stiffness, in particular in the case of large closing flaps, that is to say, flaps having a length greater than or equal to 350 millimeters (mm).

Furthermore, when these closing devices are visible from outside the vehicle, the risk of bending of the closing devices becomes high due to the pressure of the air, which becomes very substantial on the closing device.

Indeed, for such very large flaps and/or when the flaps are exposed to the pressure from the air, problems of jamming of the rotational movement between their open and closed positions may occur. As a result, the flaps do not have optimal kinematics between their open position and their closed position.

To address these problems, it is known from the state of the art to provide several separate closing devices having shorter flaps extending in the continuation of one another and each having a system for rotating the flaps. The choice in the size and shape of the flaps is therefore limited.

These closing devices are relatively bulky, and complex to make and mount on the vehicle due to the multiplicity of parts involved in the manufacturing of these devices.

SUMMARY

The invention aims to address these drawbacks by proposing an improved ventilation device.

To that end, the invention relates to a ventilation device of the aforementioned type, comprising a second actuator configured to move the closing flap between its open and closed positions by a second actuating point, the second actuating point being separate from the first actuating point, the first and second actuators being configured to move the closing flap jointly.

The second actuator makes it possible to improve the rotational movement between the open position and the closed position by increasing the torque applicable on the flap and by multiplying the actuating points on the flap.

Additionally, the ventilation system is secured due to the use of at least two different actuators, the redundancy of the actuators allowing an actuation of the closing device even in case of failure of one of the actuators.

Furthermore, the closing device allows greater freedom in the choice of the shape of the flap.

According to one embodiment, the ventilation device includes one or more of the following features, considered alone or in combination:
- the opening is delimited at least by a lower branch and an upper branch, the first and second actuators being offset on one side of the frame outside the opening, said first and second actuators extending on one side of the lower and/or upper branch opposite the opening;
- each closing flap is mounted pivoting at each of its ends on the frame along a pivot axis substantially parallel to said general direction in order to pivot the closing flap between the open position and the closed position, the first and the second actuators being configured to pivot the closing flap between the open position and the closed position;
- the pivot axis is offset from the central longitudinal axis of the closing flap;
- the first actuator and the second actuator are spaced apart from one another by at least 100 mm;
- the length of the closing flap, measured along the general direction, is greater than 200 mm;
- the closing flap has a curved shape;
- the ventilation device comprises a first and a second drive member, the first drive member being connected on the one hand to the first actuator and on the other hand to the closing flap such that the first actuator moves the closing flap by means of the first drive member, the second drive member being connected on the one hand to the second actuator and on the other hand to the closing flap such that the second actuator moves the closing flap by means of the second drive member; and
- the first and second drive members are rigid connecting rods.

The invention also relates to a vehicle comprising such a ventilation device.

BRIEF DESCRIPTION OF THE DRAWINGS

Other aspects and advantages of the invention will appear upon reading the following description, provided as an example and done in reference to the appended drawings, in which.

DETAILED DESCRIPTION

A first direction X is defined. In the present example, the first direction is parallel to a front-back axis of the vehicle. The first direction is denoted "first direction X".

In the present description, a second direction is also defined that is parallel to the axles of the vehicle. The second direction is denoted "second direction Y" or "general direction Y" and thus corresponds to the width of the vehicle.

Lastly, a third direction is also defined, perpendicular to the first direction X and the second direction Y. In the present example, the third direction corresponds to the height of the vehicle. The third direction is denoted "third direction Z".

"Inside" describes all of the volumes contained in a vehicle. By extension, "inner face" describes a face turned toward an inner volume of the vehicle. By opposition, "outer" describes any volume outside the vehicle and an outer face faces toward an outer volume.

Figure 1:
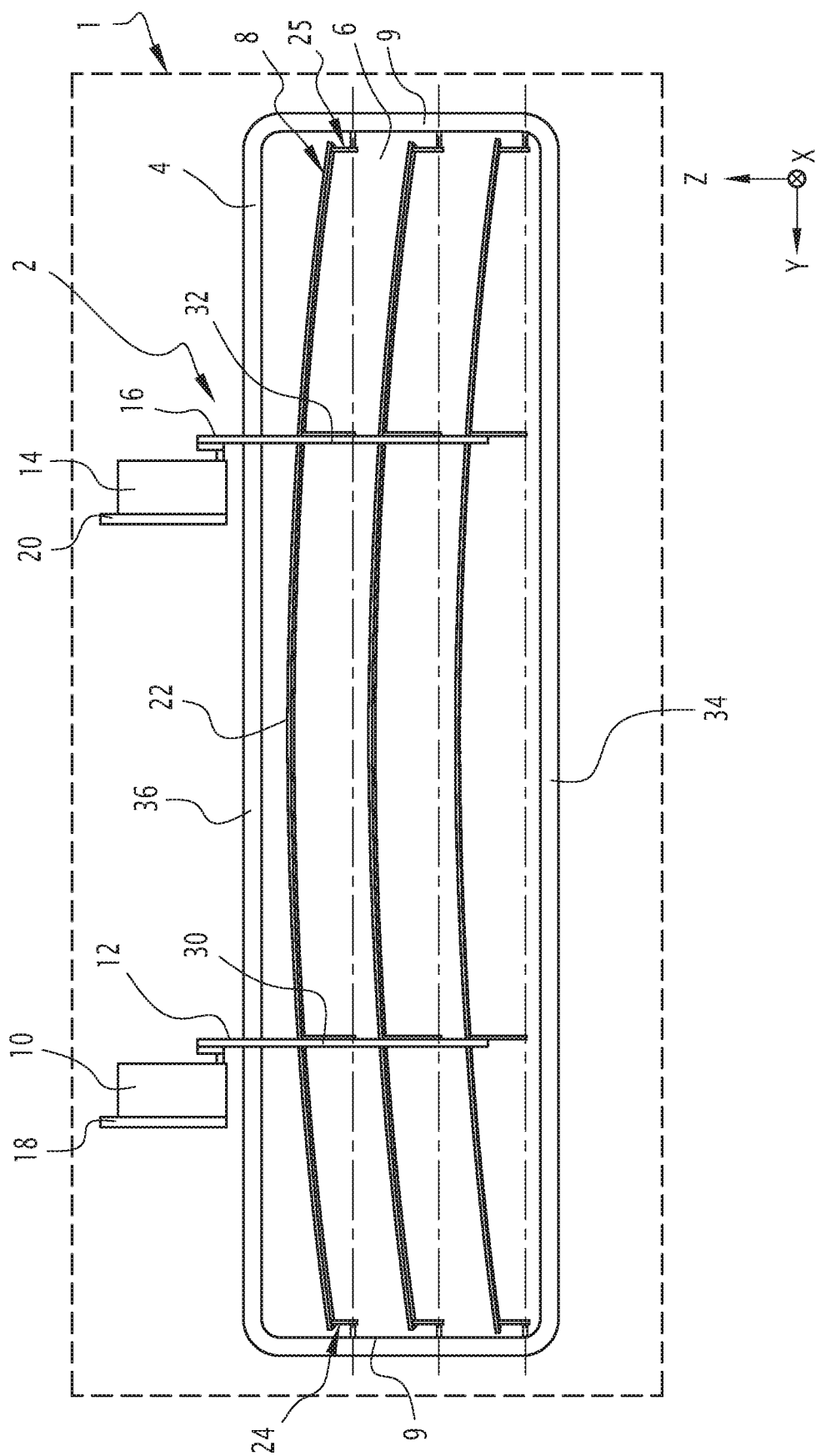
FIG. 1 is a front view of a part of the ventilation device according to an embodiment of the invention.

In reference to FIG. 1, a ventilation device 1 is described comprising a closing device 2 and a frame 4. Such a ventilation device 1 is intended to be mounted on a vehicle, for example in the front thereof, for example in the bumper of the vehicle or a dedicated part.

The frame 4 defines an air inlet opening 6 into the vehicle. The air inlet opening 6 allows the passage of air into the vehicle.

According to another embodiment, the frame 4 is formed by the bumper of the vehicle.

The closing device 2 comprises at least one closing flap 8. In the remainder of the disclosure, the closing flap 8 can be called "flap 8".

The closing device 2 further comprises at least two flap 8 supports 9 keeping each flap rotatable. In particular, the two supports 9 keep each flap rotatable about a pivot axis P that is substantially parallel to the general direction Y.

The closing flap 8 is movable between an open position and a closed position. The open position of the closing flap 8 is the position in which the passage surface of the air through the ventilation device 1 is maximal, the plane formed by the closing flap 8 for example being perpendicular to the plane formed by the frame 4. The closed position of the closing flap 8 is the position in which the passage surface of the air through the ventilation device is minimal, the plane formed by the closing flap 8 for example being coplanar to the plane formed by the frame 4. In the closed position, the closing flaps 8 are for example able to completely close the air passage through the ventilation device 1. According to one specific embodiment, the closing flap 8 is movable between a multitude of transitional positions between the open position and the closed position, allowing a precise adjustment of the air passage section through the ventilation device 1, or in other words, the flow of air through the opening 6.

In the present exemplary embodiment, the closing device 2 comprises a plurality of closing flaps 8. The closing flaps 8 are for example made from a polymer material.

Each closing flap 8 extends along a general direction substantially parallel to the second direction Y in the opening 6. The closing flap 8 defines a central longitudinal axis C passing through the mass center of the closing flap 8 and oriented along the general orientation of the closing flap 8.

In the case where the device comprises several closing flaps 8, the closing flaps are then positioned one above the other primarily along the third direction Z, as shown in FIG. 1.

Each closing flap 8 comprises a panel 22 and at least two guide members. In one specific embodiment, the closing flap 8 includes a first guide member 24 and a second guide member 25.

The closing device 2 comprises a first actuator 10 and a second actuator 14, which are arranged to move each flap 8. According to one specific embodiment illustrated in FIG. 1, the first actuator is connected to a first drive member 12 and the second actuator 14 is connected to a second drive member 16. The first drive member 12 transmits the movement from the first actuator 10 to the flap 8 and the second drive member 16 transmits the movement from the second actuator to the flap 8.

The closing device 2 comprises a first fastening area 18 keeping the first actuator 10 in position and a second fastening area 20 keeping the second actuator 14 in position.

The first 18 and second 20 fastening areas are secured to the support frame 4 of the closing system. The first 18 and second 20 fastening areas are placed inside the vehicle. The first and second fastening areas are offset on one side of the frame 4.

The panel 22 of the closing flap 8 is a plate elongated along the direction Y. The thickness of the panel 22 is significantly smaller than the other dimensions of the panel 22. The thickness is in particular significantly smaller than the length along the general direction and the width, the width being the dimension perpendicular to the thickness and the general direction.

The thickness of the panel 22 is for example at least twenty times smaller than the length along the general direction.

The thickness of the panel 22 is for example at least three times smaller than the width along the general direction.

According to one specific embodiment, the panel 22 is curved. The curve radius of the panel 22 is for example between 3 and 4 meters.

According to one embodiment, the total length of the panel 22 is greater than 200 mm. The total length of the closing flap is then greater than 200 mm.

Figure 2:
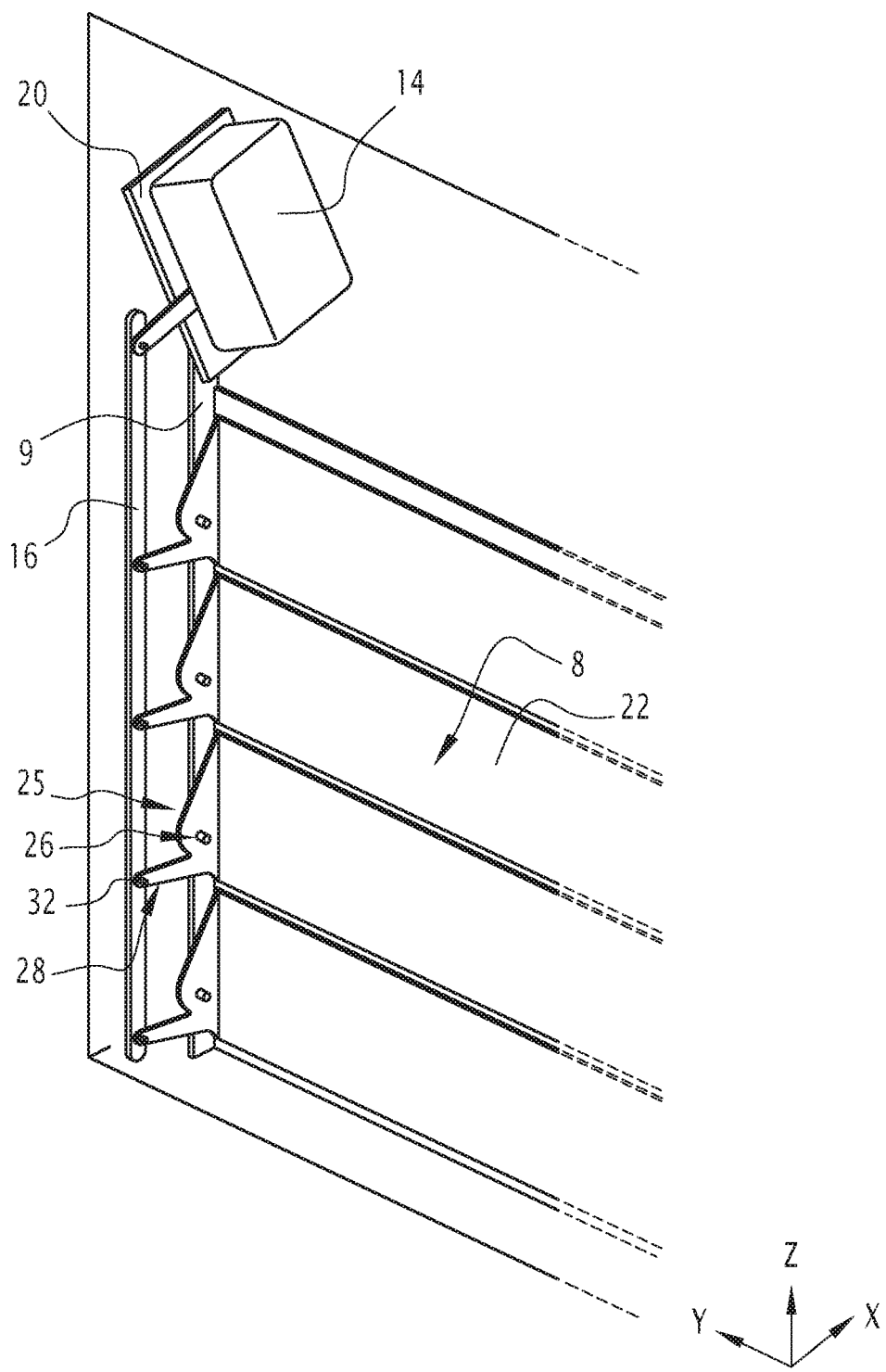
FIG. 2 is a schematic perspective view of a part of the ventilation device according to an embodiment of the invention.

The first 24 and second 25 guide members comprise a pivot region 26 as well as a drive region 28, as illustrated in FIG. 2.

The pivot region 26 cooperates with the support 9 in order to guide the rotation of the closing flap 8 about the pivot axis P. The pivot axis P thus passes through the pivot region 26.

The pivot axis P is offset from the central longitudinal axis C of the closing flap.

The first and second guide members are according to one specific embodiment, placed at the ends of the panel 22 along the general direction.

The drive region 28 of the first guide member 24 is articulated relative to the first drive member 12 at a first actuating point 30. The first guide member 24 is movable relative to the first drive member 12 in rotation along an axis oriented along the main direction and passing through the first actuating point 30.

The drive region 28 of the second guide member 25 is articulated relative to the second drive member 16 at a second actuating point 32. The second guide member 25 is movable relative to the second drive member 16 in rotation along an axis oriented along the main direction and passing through the second actuating point 32.

The first 30 and second 32 actuating points are two separate actuating points. The first 30 and second 32 actuating points are offset by at least 50 mm from the middle of the flap along its main direction.

The first actuating point is for example placed at substantially one quarter of the length of the flap and the second actuating point is placed substantially at three quarters of the length of the flap by measuring from one end of the flap along the general direction Y. Alternatively, the first actuating point 30 is placed substantially at one third of the length of the flap 8 and the second actuating point 32 is placed substantially at two thirds of the length of the flap 8.

The rotation and maintenance by the first 12 and second 16 spaced-apart drive members of the closing flap 8 in particular makes it possible to avoid twisting of this flap 8 about its central longitudinal axis C. The use of the first 12 and second 16 drive members in particular makes it possible to increase the stiffness of the closing device by multiplying the number of points connected to the frame of the vehicle.

The first drive member is articulated at both of its ends, on the one hand with the first actuator 10 and on the other hand with the closing flap 8. In particular, the first drive member 12 is connected on the one hand to the first actuator 10 and on the other hand to the drive region 28 of the first guide member 24 by a pivot link with axis oriented along the main direction.

The first drive member 12 is for example a connecting rod transmitting the movement from the first actuator 10 to the first actuating point 30.

Similarly to the first member, the second drive member 16 is articulated at both of its ends, on the one hand with the second actuator 14 and on the other hand with the closing flap 8. In particular, the second drive member 16 is connected on the one hand to the second actuator 14 and on the other hand to the drive region 28 of the second guide member 25 by a pivot link with axis oriented along the main direction.

The second drive member 16 is for example a connecting rod transmitting the movement from the second actuator 14 to the second actuating point 32. The frame 4 delimiting the opening 6 comprises at least one lower branch 34 and one upper branch 36 that are spaced apart from one another along the third direction Z. The opening 6 extends between the lower branch and the upper branch. The lower branch 34 and the upper branch 36 are oriented along the main direction.

According to one specific embodiment, the frame 4 includes the two supports 9. The two supports 9 then form side branches of the frame 4 coupling the lower and upper branches to one another at each of their ends along the main direction. The opening 6 then extends between the two supports 9.

The first 10 and second 14 actuators are offset outside the opening 6. At least one securing member keeps the first actuator 10 on the first fastening zone 18. The first actuator 10 is offset on one side of the frame 4 outside the opening 6. The first actuator 10 in particular extends on one side of the upper branch 36 opposite the opening. In other words, the first actuator 10 does not extend in or across from the opening along the first direction X. According to an alternative embodiment, the first actuator 10 extends on one side of the lower branch 34 opposite the opening.

Similarly to the first actuator 10, at least one securing member keeps the second actuator 14 on the second fastening zone 20. The second actuator 14 is offset on one side of the frame 4 outside the opening 6. The second actuator 14 in particular extends on one side of the upper branch 36 opposite the opening 6. In other words, the second actuator 14 does not extend in or across from the opening along the first direction X. According to an alternative embodiment, the second actuator 14 extends on one side of the lower branch opposite the opening.

This configuration then makes it possible to hide the first 10 and second 14 actuators from the view of a user outside the vehicle, since they are not visible through the opening 6. This thus improves the esthetics of the vehicle.

In one embodiment that is not illustrated, the first 12 and second 16 drive members are guided relative to the frame 6 at their end opposite that connected to the actuators 10 and 14 and are articulated between their ends with the drive region 28 of the closing flaps 8. According to this variant, the first drive member 12 is guided on one side of the opening 6 by a first additional guide means and is actuated on the other side of the opening by the first actuator 10. Likewise, the second drive member 16 is then guided on one side of the opening 6 by a second additional guide means and is actuated on the other side of the opening by the second actuator 14. In particular, if an actuator 10, respectively 14, of the first 12, respectively second 16 drive member, extends on a side of the upper branch 36 opposite the opening, then the additional guide means of the first 12, respectively second 16 drive member, extends on a side of the lower branch 34 opposite the opening. Likewise, if an actuator 10, respectively 14, of the first 12, respectively second 16 drive member, extends on a side of the lower branch 34 opposite the opening, then the additional guide means of the first 12, respectively second 16 drive member, extends on a side of the upper branch 36 opposite the opening. The first 10 and second 14 actuators are spaced apart from one another by at least 100 mm along the general direction Y.

The first 10 and second 14 actuators are configured to pivot the closing flap 8. The first 10 and second 14 actuators are more specifically configured to pivot the closing flap 8 between its open and closed positions by means of the first 12 and second 16 drive members.

The first actuator 10 is configured to move the closing flap 8 by moving the first actuating point 30.

The second actuator 14 is configured to move the closing flap 8 by moving the second actuating point 32.

The first 10 and second 14 actuators are configured to pivot the closing flap 8 jointly.

The first 10 and second 14 actuators are for example electronically synchronized in order to drive the first 30 and second 32 actuating points in a same rotation about the pivot axis P. The first 10 and second 14 actuators are in particular actuated at the same time. The movement of the first 30 and second 32 actuating points is simultaneous and follows a same kinematic. According to one specific embodiment, the movement of the first 10 and second 14 actuators follows a same kinematic.

The ventilation device previously described includes two different actuators 10 and 14 actuating the flap 8 at two different actuating points 30 and 32. This allows the application of a greater torque on the closing flap 8, limiting possible jamming problems.

The operation of the ventilation device 1 according to an embodiment of the invention will now be described.

The first 10 and second 14 actuators for example include a motor rotating a moving region of the actuator.

The movement generated by the motor of the first actuator 10 and its moving region drives the movement of the first drive member 12, in turn driving the movement of the first actuating point 30 and rotating the closing flap 8 about the pivot axis P.

Likewise, the movement generated by the motor of the second actuator 14 and its moving region drives the movement of the second drive member 16, in turn driving the movement of the second actuating point 32 and rotating the closing flap 8 about the pivot axis P.

The motors of the first 10 and second 14 actuator are in particular synchronized in order to rotate the closing flap 8 without deforming said closing flap 8 along its main axis.

According to an alternative embodiment, the ventilation device 1 comprises more than two actuators, each actuator being connected to a drive member and each drive member also being connected to an actuating point of the flap that is specific to it.

The invention claimed is:

1. A ventilation device for a vehicle, comprising:
    a frame defining an opening;
    a closing device that comprises at least one closing flap extending in an extension direction in the opening, the closing device being movable between an open position and a closing position, wherein a passage surface for air through the ventilation device is smaller than the passage surface for the air in the open position, the flap being movable between an open position when the closing device is in the open position and a closed position when the closing device is in the closing position, the closing device comprising a first actuator configured to move the closing flap between the open and closed positions of the closing flap by a first actuating point; and
    a second actuator configured to move the closing flap between the open and closed positions of the closing flap by a second actuating point, the second actuating point being separate from the first actuating point, the first and second actuators being configured to move the closing flap jointly.

2. The ventilation device according to claim 1, wherein the opening is delimited at least by a lower branch and an upper branch, the first and second actuators being offset on one side of the frame outside the opening, said first and second actuators extending on one side of the lower and/or upper branch opposite the opening.

3. The ventilation device according to claim 1, wherein each closing flap is mounted pivoting at each of its ends on the frame along a pivot axis substantially parallel to said extension direction in order to pivot the closing flap between the open position and the closed position, the first and the second actuators being configured to pivot the closing flap between the open position and the closed position.

4. The ventilation device according to claim 3, wherein the pivot axis is offset from a central longitudinal axis of the closing flap.

5. The ventilation device according to claim 1, wherein the first actuator and the second actuator are spaced apart from one another by at least 100 mm.

6. The ventilation device according to claim 1, wherein a length of the closing flap, measured along the extension direction, is greater than 200 mm.

7. The ventilation device according to claim 1, wherein the closing flap has a curved shape.

8. The ventilation device according to claim 1, comprising a first and a second drive member, the first drive member being connected to the first actuator and to the closing flap such that the first actuator moves the closing flap via the first drive member, the second drive member being connected to the second actuator and to the closing flap such that the second actuator moves the closing flap via the second drive member.

9. The ventilation device according to claim 8, wherein the first and second drive members are rigid connecting rods.

10. A vehicle comprising the ventilation device according to claim 1, wherein the ventilation device is mounted on the vehicle.

11. A ventilation device for a vehicle, comprising:
    a frame defining an opening;
    a closing device that comprises at least one closing flap extending in an extension direction in the opening, the closing device being movable between an open position and a closing position, wherein a passage surface for air through the ventilation device is smaller than the passage surface for the air in the open position, the flap being movable between an open position when the closing device is in the open position and a closed position when the closing device is in the closing position, the closing device comprising a first actuator configured to move the closing flap between the open and closed positions of the closing flap by a first actuating point;
    a second actuator configured to move the closing flap between the open and closed positions of the closing flap by a second actuating point, the second actuating point being separate from the first actuating point, the first and second actuators being configured to move the closing flap jointly; and
    a first and a second drive member, the first drive member being connected to the first actuator and to the closing flap such that the first actuator moves the closing flap via the first drive member, the second drive member being connected to the second actuator and to the closing flap such that the second actuator moves the closing flap via the second drive member.

* * * * *